(12) United States Patent
O'Keefe et al.

(10) Patent No.: US 8,328,476 B2
(45) Date of Patent: Dec. 11, 2012

(54) QUICK CHANGE ARBOR, HOLE CUTTER, AND METHOD

(75) Inventors: Charles M. O'Keefe, Monson, MA (US); Joseph Thomas Novak, East Longmeadow, MA (US); James E. Pangerc, Williamston, SC (US)

(73) Assignee: Irwin Industrial Tool Company, Huntersville, NC (US)

( * ) Notice: Subject to any disclaimer, the term of this patent is extended or adjusted under 35 U.S.C. 154(b) by 773 days.

(21) Appl. No.: 12/406,724

(22) Filed: Mar. 18, 2009

(65) Prior Publication Data
US 2009/0279971 A1 Nov. 12, 2009

Related U.S. Application Data

(63) Continuation-in-part of application No. 12/050,844, filed on Mar. 18, 2008.

(51) Int. Cl.
*B23B 51/04* (2006.01)
(52) U.S. Cl. .................... 408/204; 408/239 R
(58) Field of Classification Search .......... 408/204–206, 408/238, 239 R, 239 A, 703; *B23B 51/04, B23B 51/05*
See application file for complete search history.

(56) References Cited

U.S. PATENT DOCUMENTS

| | | | |
|---|---|---|---|
| 3,784,316 A | 1/1974 | Bittern | |
| 3,970,407 A * | 7/1976 | Uffman | 408/204 |
| 3,976,387 A | 8/1976 | Segal | |
| 4,036,560 A | 7/1977 | Clark et al. | |
| 4,148,593 A | 4/1979 | Clark | |
| 4,303,357 A | 12/1981 | Makar | |
| 4,490,080 A | 12/1984 | Kezran | |
| 4,580,472 A | 4/1986 | Kastner | |
| 4,651,600 A | 3/1987 | Zettl | |
| 5,035,548 A | 7/1991 | Pidgeon | |
| 5,108,235 A | 4/1992 | Czyzewski | |
| 5,226,762 A | 7/1993 | Ecker | |
| 5,246,317 A | 9/1993 | Koetsch et al. | |
| 5,281,060 A * | 1/1994 | Strange et al. | 408/204 |
| 5,352,071 A | 10/1994 | Cochran et al. | |
| 5,447,397 A * | 9/1995 | Asano | 408/59 |
| 5,813,802 A | 9/1998 | Ajimi et al. | |
| 6,120,221 A | 9/2000 | Alm | |
| 6,341,925 B1 | 1/2002 | Despres | |
| 6,588,993 B2 * | 7/2003 | Omi | 408/226 |

(Continued)

FOREIGN PATENT DOCUMENTS

DE 201 02 516 U1 8/2001

(Continued)

OTHER PUBLICATIONS

International Preliminary Report on Patentability for International Application No. PCT/US2009/037554.

*Primary Examiner* — Daniel Howell
(74) *Attorney, Agent, or Firm* — McCarter & English, LLP

(57) ABSTRACT

An arbor is provided for small diameter quick change and standard hole cutters. Each hole cutter defines an outer diameter of less than 1¼ inches, a central aperture and at least one drive pin recess. The arbor comprises an arbor body including an end portion engageable within the central aperture, and a drive member having at least one drive pin for engaging a corresponding drive pin recess of the hole cutter for rotatably driving the hole cutter.

18 Claims, 11 Drawing Sheets

U.S. PATENT DOCUMENTS

| | | |
|---|---|---|
| 6,623,220 B2 | 9/2003 | Nuss et al. |
| 6,641,338 B2 | 11/2003 | Despres |
| 6,705,807 B1 | 3/2004 | Rudolph et al. |
| 7,001,119 B2 | 2/2006 | Wendzina et al. |
| 7,104,738 B2 | 9/2006 | Cantlon |
| 8,079,787 B2 * | 12/2011 | Chao .................... 408/206 |
| 2002/0122703 A1 | 9/2002 | Czyzewski et al. |
| 2002/0131835 A1 | 9/2002 | Despres |
| 2004/0154837 A1 | 8/2004 | Gaul |
| 2004/0179911 A1* | 9/2004 | Keightlev .................... 408/204 |
| 2005/0025591 A1 | 2/2005 | Korb et al. |
| 2007/0036620 A1* | 2/2007 | Keightley .................... 408/204 |
| 2007/0071565 A1 | 3/2007 | Singh et al. |
| 2007/0160434 A1 | 7/2007 | Gillissen |
| 2007/0212179 A1 | 9/2007 | Khangar et al. |
| 2008/0019785 A1* | 1/2008 | Keightley .................... 408/204 |
| 2008/0118315 A1 | 5/2008 | Brunson |
| 2008/0260480 A1* | 10/2008 | Keightley .................... 408/204 |

FOREIGN PATENT DOCUMENTS

| | | | |
|---|---|---|---|
| JP | 07009226 A | * | 1/1995 |
| JP | 7241840 A | | 9/1995 |
| JP | 9117814 A | | 5/1997 |
| JP | 11010633 A | * | 1/1999 |
| JP | 2002096222 A | | 4/2002 |
| JP | 2004181622 A | | 7/2004 |
| JP | 2004216508 A | | 8/2004 |
| JP | 2006198699 A | | 8/2006 |
| WO | WO 03024677 A1 | * | 3/2003 |
| WO | WO 2005120754 A1 | * | 12/2005 |
| WO | WO 2008064409 A1 | * | 6/2008 |

* cited by examiner

QUICK CHANGE ARBOR, HOLE CUTTER, AND METHOD

CROSS-REFERENCE TO RELATED APPLICATIONS

This application is a continuation-in-part of U.S. patent application Ser. No. 12/050,844, filed Mar. 18, 2008, the contents of which are hereby incorporated by reference in their entirety as part of the present disclosure.

FIELD OF THE INVENTION

The present invention relates to arbors for hole cutters, hole cutters, and related methods, and more particularly, to arbors for relatively small hole cutters defining outer diameters of less than 1¼ inches and adapted to be driven off of the drive members of corresponding arbors, hole cutters defining outer diameters of less than 1¼ inches, and related methods facilitating relatively quick attachment and release of such hole cutters to and from arbors.

BACKGROUND

Prior art hole saws having outer diameters of 1¼ inches or greater typically include an end portion defining a threaded aperture and at least two drive pin apertures. The hole saws are coupled to desired power tools or machines via arbors, which typically include threaded end portions that engage the saws' threaded apertures, and drive pin plates having drive pins that extend into the saws' drive pin apertures. When mounting a hole saw of this variety to an arbor, the saw is threaded onto the arbor's end portion until the saw is secured to the arbor body and the drive pin apertures align with the corresponding drive pins of the arbor's drive pin plate. The drive pin plate is then moved toward the saw until the drive pins are received within the drive pin apertures. With this arrangement, the hole saw is driven off of the drive pins as opposed to the arbor's threads, thereby reducing the possibility that the saw will lock up on the arbor's threads during use or otherwise damage the threads.

Because of their smaller size, conventional hole saws having outer diameters of less than 1¼ inches (i.e. "small diameter hole saws") and the arbors used to drive such small diameter hole saws do not have sufficient room for, and therefore do not include drive pin apertures and drive pins, respectively. Consequently, typical arbors used to drive such smaller diameter hole saws do not include drive pins and, as a result, typically drive the hole saws with the threaded end portions of the arbors. A significant drawback of this configuration is that the hole saw can lock up on the threads during use which, in turn, makes it exceedingly difficult if not impossible to remove the saw from the arbor. When confronted with a hole saw that is locked up on its arbor's threads, users may choose to sacrifice the arbor (i.e., dispose of the arbor prematurely with the locked up hole saw attached) to avoid the difficult and time consuming task of separating the arbor from the hole saw. Further, even if the hole saw is successfully removed from the arbor, the task of removing a locked up hole saw can result in permanent damage to the arbor and/or hole saw threads.

To assist users in removing locked up small diameter hole saws, prior art hole saws have been devised with wrench flats on the end caps of the hole saws to allow users to employ tools, such as wrenches, to remove such hole saws when locked up on the threads of an arbor. A typical such group of prior art hole saws is shown in FIG. 14. However, even with the inclusion of wrench flats, the engaging threads of the hole saws and/or arbors can be stripped and/or damaged beyond repair when users attempt to unlock and remove the saws from the arbors. Furthermore, the Applicant is not aware of any teaching or suggestion in the prior art to drive small diameter hole saws off of the wrench flats. And, even if one were to devise an arbor for driving a small diameter hole saw from the wrench flats (and Applicant is not aware of any such teaching or suggestion in the prior art), the arbor would not be compatible with all sizes of small diameter hole saws (i.e., the arbor could not drive from the flats) because the widths between the wrench flats differ among many different sizes of the small diameter hole saws, typically increasing as the size of the hole saw increases. In the exemplary group of prior art hole saws shown in FIG. 14, the distance between the wrench flats for the illustrated hole saws varies as follows:

| Prior Art Hole Saw Diameter | ⅞ inch | 15/16 inch | 1 inch | 1 1/16 inch | 1 ⅛ inch |
|---|---|---|---|---|---|
| Distance Between Wrench Flats | 0.620 inch | 0.750 inch | 0.745 inch | 0.870 inch | 0.870 inch |

Three of the most popular sized small diameter hole saws are the ⅞ inch diameter hole saw, the 1 inch diameter hole saw, and the 1⅛ inch diameter hole saw. As can be seen, in the exemplary prior art set of small diameter hole saws, each of these most popular hole cutters defines a different width or distance between the wrench flats. Accordingly, even if one desired to drive such hole saws from the wrench flats (which Applicant does not believe is taught or suggested by the prior art), because the wrench flats of such popular sizes define different widths between the flats, the same arbor could not be used to drive the different sized hole saws. Other hole saws in such exemplary set of prior art small diameter hole saws include an 11/16 inch diameter hole saw, a ¾ inch diameter hole saw, a 25/32 inch diameter hole saw, a 13/16 inch diameter hole saw, and a 13/16 inch diameter hole saw. These hole saws having diameters between 11/16 inch and 13/16 inch define widths between wrench flats of about 0.620 inch or about 0.625 inch, and the 13/16 inch diameter hole saw defines a width between the wrench flats of about 0.995 inch.

Another drawback of prior art small diameter hole saws is that, without the aid of drive pins, the arbors can fail to properly secure the saws during use, particularly in cases where the hole saws are not correctly threaded onto the associated arbors. This failure results in off-axis wobble, especially at high rotational speeds. Off-axis wobble can cause undesirable vibrations of the saw during use which, in turn, can reduce the life of the saw and/or create an unacceptable degree of cutting inaccuracy.

Another drawback of prior art small diameter hole saws is that multiple revolutions are required to threadedly attach and remove the hole saws to and from the arbors. Further, when attaching the hole saws, the hole saw threads must be properly aligned and threadedly engaged with the arbor threads to avoid off-axis wobble (as discussed above) and to prevent the arbor threads and/or hole saw threads from stripping, which can render the arbor and/or hole saw unusable.

Accordingly, it is an object of the present invention to overcome one or more of the above-described drawbacks and/or disadvantages of prior art small diameter hole saws and arbors.

SUMMARY OF THE INVENTION

In accordance with a first aspect, the present invention is directed to an arbor that is connectable to a hole cutter, and in some embodiments of the present invention, also is connectable to a standard hole cutter. The hole cutter defines an outer diameter of less than 1¼ inches, an end portion defining an approximately central aperture, and at least one drive pin recess radially spaced relative to the central aperture. The arbor comprises an arbor body including on an end thereof a connecting portion engageable with the central aperture of the hole cutter. A drive member is mounted on the arbor body and includes at least one drive pin radially spaced relative to the arbor body. The drive member is movable axially relative to the arbor body between engaged and disengaged positions. In the engaged position, the at least one drive pin is received within the respective at least one drive pin recess of the hole cutter to rotatably drive the hole cutter with the arbor. In the disengaged position, the drive member is axially spaced from the hole cutter and the drives pin(s) is/are not received within the respective drive pin recess(es). In some embodiments of the present invention, the connecting portion of the arbor body defines a first thread, and the central aperture of the hole cutter defines a second thread that is threadedly engageable with the first thread to connect the hole cutter to the arbor body.

In some embodiments of the present invention, the arbor body and/or hole cutter is rotatable relative to the other between a first engagement position and a second engagement position. In some such embodiments, the angular extent of rotation between the first and second engagement positions is within the range of about 30° and about 180°, and in some such embodiments, the angular extent of rotation is about 90°. In some embodiments of the present invention, the drive member defines an aperture that receives therethrough the arbor body and is configured to allow relative axial movement, but to prevent relative rotational movement, of the arbor body and drive member. In some embodiments, the hole cutter comprises two recesses and the drive member comprises two drive pins receivable within the respective recesses.

In some embodiments of the present invention, the at least one drive pin recess defines a first substantially flat surface, and the at least one drive pin defines a second substantially flat surface. The first and second substantially flat surfaces engage one another when the drive member is in the engaged position to further prevent relative rotational movement of the hole cutter and drive member.

Some embodiments of the present invention further comprise a biasing member, such as a coil spring, that normally biases the drive member in the direction from the disengaged into the engaged position. Preferably, the biasing member automatically drives the drive member into the engaged position upon moving the hole cutter into the second engagement position. One advantage of this feature is that it facilitates one-handed attachment of the hole cutter to the arbor, or otherwise facilitates rapid attachment and detachment of the hole cutter to and from the arbor.

In accordance with another aspect of the present invention, the central aperture of the hole cutter defines a plurality of curvilinear protrusions and a plurality of relatively recessed curvilinear portions formed therebetween. The connecting portion of the arbor similarly defines a plurality of angularly extending protrusions and a plurality of relatively recessed portions formed therebetween. The arbor and/or hole cutter is rotatable relative to the other between a first engagement position and a second engagement position. In the first engagement position, the protrusions of the connecting portion are received within the recesses of the central aperture, and the protrusions of the central aperture are received within the recessed portions of the connecting portion. In the second engagement position, the protrusions of the connecting portion are engaged with the protrusions of the central aperture. In some such embodiments, the protrusions of the connecting portion define a first thread, the protrusions of the central aperture define a second thread, and the first and second threads are threadedly engaged with each other in the second engagement position. In some such embodiments, the threads on the connecting portion of the arbor are configured to substantially align the at least one drive pin with the at least one drive pin recess of the hole cutter in the second engagement position. In some such embodiments, the first and second threads define an axial clearance therebetween allowing the end portion of the hole cutter to substantially contact a stop surface of the arbor body in the both the first engagement position and the second engagement position. In some such embodiments, at least one of the angularly extending protrusions defines a greater or lesser angular extent than at least one other angular extending protrusion of the respective central aperture and connecting portion, thereby permitting receipt of the connecting portion within the central aperture in only the first engagement position.

In accordance with another aspect, the present invention is directed to an arbor for a hole cutter defining an outer diameter of less than 1¼ inches, an end portion defining an approximately central aperture, and at least one recess radially spaced relative to the central aperture. The arbor comprises first means for drivingly connecting a power tool to the hole cutter, and second means on an end thereof for releasably engaging the central aperture of the hole cutter. Third means are provided for receiving therethrough the first means and for allowing relative axial movement, but for preventing relative rotational movement, of the first means and the third means. The third means includes at least one fourth means radially spaced relative to the first means for receipt within the at least one recess of the hole cutter and for rotatably driving the hole cutter.

In some embodiments, fifth means are provided (i) for allowing rotational movement of at least one of the first means and the hole cutter relative to the other between a first engagement position and a second engagement position for connecting the hole cutter to the first means, and (ii) for substantially aligning the at least one fourth means with the at least one corresponding recess of the hole cutter in the second engagement position to, in turn, allow axial movement of the third means relative to the first means in the second engagement position between a disengaged position axially spaced relative to the hole cutter, and an engaged position with the at least one fourth means received within the corresponding recess of the hole cutter. In some embodiments, sixth means are provided for biasing the third means in the direction from the disengaged position to the engaged position.

In accordance with another aspect, the present invention is directed to a hole cutter that is attachable to an arbor. The arbor includes a threaded end portion defining at least one male threaded portion, and a drive member including at least one drive pin thereon and movable axially relative to the arbor between an engaged position with the drive pin engaging the hole cutter, and a disengaged position with the drive pin disengaged from the hole cutter. The hole cutter comprises a blade including a blade body defining an outer diameter of less than 1¼ inches and a cutting edge defined by a plurality of cutting teeth. An end portion of the hole cutter is fixedly secured to the blade body and defines an approximately central aperture preferably including on a peripheral portion thereof at least one female threaded portion, and at least one drive pin recess radially spaced relative to the central aperture. In some embodiments of the present invention, the female threaded portion cooperates with the male threaded portion of the arbor to define (i) a first engagement position wherein the lead male and female threads engage or substantially engage one another and define a first axial clearance relative to each other, and (ii) a second engagement position angularly spaced relative to the first engagement position. In the second engagement position, the male and female threads engage one another and define a second axial clearance less than the first axial clearance, and the drive pin recess is aligned with a respective drive pin of the arbor for receiving the drive pin with the drive member located in the engaged position.

Preferably, the arbor further defines a stop surface and, in the second engagement position, the end portion of the hole cutter is in contact with the stop surface. In some embodiments, the female threaded portion defines an axial clearance relative to the male threaded portion allowing the end portion of the hole cutter to substantially contact the stop surface of the arbor in the both the first engagement position and the second engagement position. In some embodiments, the connecting portion of the arbor defines a plurality of angularly extending protrusions and a plurality of relatively recessed portions formed therebetween; and the central aperture of hole cutter defines a plurality of angularly extending protrusions and a plurality of relatively recessed portions formed therebetween. In the first engagement position, the protrusions of the arbor connecting portion are received within the recesses of the central aperture, and the protrusions of the central aperture are received within the recessed portions of the arbor connecting portion. In the second engagement position, the protrusions of the arbor connecting portion are engaged with the protrusions of the central aperture. In some such embodiments, at least one of the angularly extending protrusions defines a greater or lesser angular extent than at least one other angular extending protrusion of the respective central aperture and connecting portion, thereby permitting receipt of the connecting portion within the central aperture in only the first engagement position.

In some embodiments of the present invention, the at least one drive pin recess defines a first substantially flat surface, and the at least one drive pin defines a second substantially flat surface that engages the first substantially flat surface when the drive member is in the engaged position. In some such embodiments, the at least one drive pin recess extends axially from a point spaced axially inwardly relative to the cutting edge and through the end portion of the hole cutter.

In accordance with another aspect, the present invention is directed to a hole cutter that is attachable to an arbor. The arbor includes a threaded end portion defining at least one male threaded portion, and a drive member including at least one drive pin thereon and movable axially relative to the arbor between an engaged position with the drive pin engaging the hole cutter, and a disengaged position with the at least one drive pin disengaged from the hole cutter. The hole cutter comprises first means for cutting a hole and defining an outer diameter of less than 1¼ inches, and an approximately central aperture formed in an end portion of the hole cutter for releasably connecting the first means to the arbor. Second means are radially spaced relative to the central aperture and are engageable with a respective drive pin of the arbor in the engaged position for rotatably driving the hole saw with the arbor.

In some embodiments of the present invention, the hole cutter includes at the central aperture third means for engaging the end portion of the arbor in a first engagement position defining a first axial clearance therebetween, allowing relative rotational movement of at least one of the hole cutter and arbor body relative to the other between the first engagement position and a second engagement position angularly spaced relative to the first engagement position, and defining a second axial clearance therebetween less than the first axial clearance. In the second engagement position, the second means are aligned with the at least one drive pin of the arbor for receiving the at least one drive pin with the drive member located in the engaged position.

In accordance with another aspect, the present invention is directed to a method comprising the following steps:

(i) providing an arbor including a connecting portion that is connectable to a hole cutter defining an outer diameter of less than 1¼ inches. The hole cutter includes an end portion defining an approximately central aperture and at least one drive pin recess radially spaced relative to the central aperture. The arbor includes a connecting portion and a drive member movable axially, but not rotationally, relative to the arbor. The drive member includes at least one drive pin extending therefrom;

(ii) connecting the central aperture of the hole cutter to the connecting portion of the arbor;

(iii) inserting the connecting portion of the arbor into the central aperture of the hole cutter to define a first engagement position;

(iv) substantially aligning the at least one drive pin with the at least one corresponding drive pin recess of the hole cutter;

(v) either moving or allowing axial movement of the drive member relative to the arbor between a disengaged position axially spaced relative to the hole cutter, and an engaged position with the at least one drive pin received within the corresponding drive pin recess of the hole cutter; and (vi) rotatably driving the hole cutter with the at least one drive pin of the arbor.

In some embodiments, the method further comprises the steps of: providing a quick change hole cutter including an approximately central aperture defining along a periphery thereof a plurality of angularly extending protrusions and a plurality of recesses formed therebetween; providing an arbor having a connecting portion defining a plurality of angularly extending protrusions and a plurality of recesses formed therebetween; inserting at least one of the protrusions of the connecting portion and the protrusions of the central aperture into the recesses of the other in the first engagement position; and rotating at least one of the hole cutter and arbor body relative to the other from the first engagement position to the second engagement position and, in turn, engaging at least one of the protrusions of the connecting portion and of the central aperture with the other.

Some embodiments of the present invention further comprise the steps of normally biasing the drive member from the disengaged position toward the engaged position and, upon moving the hole cutter from the first engagement position into the second engagement position, automatically biasing the drive pin member into the engaged position to, in turn, drive the at least one drive pin into the corresponding drive pin recess and secure the hole cutter to the arbor.

In accordance with another aspect, the present invention is directed to a plurality of hole cutters, each hole cutter comprises a blade including a blade body defining a respective outer diameter of less than 1¼ inches and a cutting edge defined by a plurality of cutting teeth. A base portion of each hole cutter opposite the cutting edge defines a threaded aperture adapted for threadedly engaging a corresponding threaded end portion of an arbor. The base portion includes at least two drive surfaces radially spaced relative to the threaded aperture on substantially opposite sides of the threaded aperture relative to each other and defining a distance therebetween. The plurality of hole cutters includes two hole cutters having blade bodies defining different outer diameters relative to each other that are each one of about ⅞ inch, about 1 inch and about 1⅛ inches, and the distance between the drive surfaces is substantially the same for each of the plurality of hole cutters.

In some embodiments of the present invention, the plurality of hole cutters includes three hole cutters, wherein one hole cutter includes a blade body defining an outer diameter of about ⅞ inch, another hole cutter includes a blade body defining an outer diameter of about 1 inch, and another hole cutter includes a blade body defining an outer diameter of about 1⅛ inches. In some embodiments of the present invention, the plurality of hole cutters includes a plurality of hole cutters having blade bodies defining additional outer diameters, wherein the additional outer diameters are selected from the group including: about 9/16 inch, about ⅝ inch, about 11/16 inch, about ¾ inch, about 25/32 inch, about 13/16 inch, about 15/16 inch, about 1 1/16 inches, and about 1 3/16 inches. In some embodiments of the present invention, the outer diameter of the blade body of each hole cutter of the plurality of hole cutters is different than the outer diameter of the blade body of every other hole cutter in the plurality of hole cutters.

In accordance with another aspect, the present invention is directed to a plurality of hole cutters. Each hole cutter is attachable to an arbor including a threaded end portion, and at least two drive members radially spaced relative to the threaded end portion and movable axially, but not rotationally, relative to the threaded end portion between (i) an engaged position with the drive members engaging a respective hole cutter to rotatably drive the hole cutter, and (ii) a disengaged position with the drive members disengaged from the hole cutter. Each hole cutter comprises a blade including a blade body defining a respective outer diameter of less than 1¼ inches and a cutting edge defined by a plurality of cutting teeth. A base portion of each hole cutter located opposite the cutting edge defines a threaded aperture adapted for threadedly engaging the threaded end portion of the arbor. The base portion further includes at least two drive surfaces radially spaced relative to the threaded aperture on substantially opposite sides of the threaded aperture relative to each other and defining a distance therebetween. Each drive surface engages a respective drive member of the arbor in the engaged position for rotatably driving the hole cutter. The plurality of hole cutters includes two hole cutters having blade bodies defining different outer diameters relative to each other that are each one of about ⅞ inch, about 1 inch and about 1⅛ inches, and the distance between the drive surfaces is substantially the same for each of the plurality of hole cutters.

In some embodiments of the present invention, the plurality of hole cutters includes three hole cutters, wherein one hole cutter includes a blade body defining an outer diameter of about ⅞ inch, another hole cutter includes a blade body defining an outer diameter of about 1 inch, and another hole cutter includes a blade body defining an outer diameter of about 1⅛ inches. Some embodiments of the present invention further comprise a plurality of hole cutters having blade bodies defining additional outer diameters selected from the group including: about 9/16 inch, about ⅝ inch, about 11/16 inch, about ¾ inch, about 25/32 inch, about 13/16 inch, about 15/16 inch, about 1 1/16 inches, and about 1 3/16 inches.

In accordance with another aspect, the present invention is directed to a plurality of hole cutters. Each hole cutter is attachable to an arbor including a threaded end portion, and at least two drive members radially spaced relative to the threaded end portion and movable axially, but not rotationally, relative to the threaded end portion between (i) an engaged position with the drive members engaging a respective hole cutter to rotatably drive the hole cutter, and (ii) a disengaged position with the drive members disengaged from the hole cutter. Each hole cutter comprises first means for cutting a hole and defining an outer diameter of less than 1¼ inches; second means for threadedly connecting the first means to the threaded end portion of the arbor; and a pair of third means radially spaced on opposite sides of the second means relative to each other, and defining a distance therebetween, for engaging respective drive members of the arbor in the engaged position, and for rotatably driving the hole cutter with the arbor. The plurality of hole cutters includes two hole cutters having first means defining different outer diameters relative to each other, and each outer diameter is one of about ⅞ inch, about 1 inch, and about 1⅛ inches, and the distance between the third means is substantially the same for each of the plurality of hole cutters.

In some embodiments of the present invention, the first means is a hole cutter blade defining the respective outer diameter, the second means is a threaded aperture, and each third means is a drive surface located on an opposite side of the threaded aperture relative to the other drive surface.

One advantage of the present invention is that allows a hole saw having an outer diameter of less than 1¼ inches to be driven off of drive pins as opposed to the arbor threads to prevent the saw from locking up on the arbor threads during use. Another advantage of some currently preferred embodiments of the present invention is that it allows a hole cutter to be relatively quickly engaged with, and disengaged from, the arbor. Yet another advantage of some currently preferred embodiments of the present invention is that one arbor can accept both quick change and standard hole cutters.

Another advantage of the present invention is that it allows all sizes of small diameter hole cutters included in a given set or plurality to be driven off of the drive pins of the same arbor.

Other objects, advantages and features of the present invention, and/or of the currently preferred embodiments thereof, will become more readily apparent in view of the following detailed description of the currently preferred embodiments and accompanying drawings.

DETAILED DESCRIPTION OF THE CURRENTLY PREFERRED EMBODIMENTS

Figure 1:
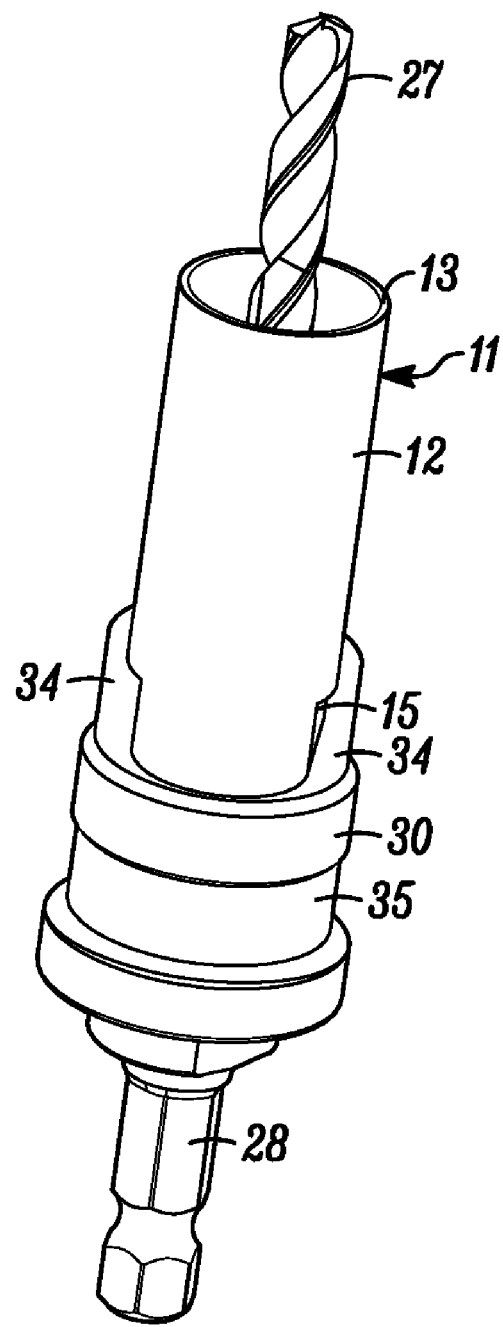
FIG. 1 is a perspective view of an arbor for a small diameter hole cutter according to an embodiment of the invention.

In FIGS. 1 through 9, an arbor embodying the present invention is indicated generally by the reference numeral 10. The arbor 10 is usable with small diameter hole cutters. Such small diameter hole cutters conform to the ASME B94.54-1999 standard, and in accordance with such ASME standard, have an outside diameter of less than 1¼ inches. The term "hole cutter" is used herein to mean any of numerous different types of cutting tools for cutting holes in work pieces, such as hole saws, sheet metal hole cutters, etc.; the term "small diameter hole cutter" is used herein to refer to such hole cutters including blades having outside diameters of less than 1¼ inches; and the term "arbor" is used herein to mean any of numerous different types of devices for supporting a rotating tool, such as a hole cutter, on a power tool such as a drill, and further includes, without limitation, mandrels.

Figure 2:
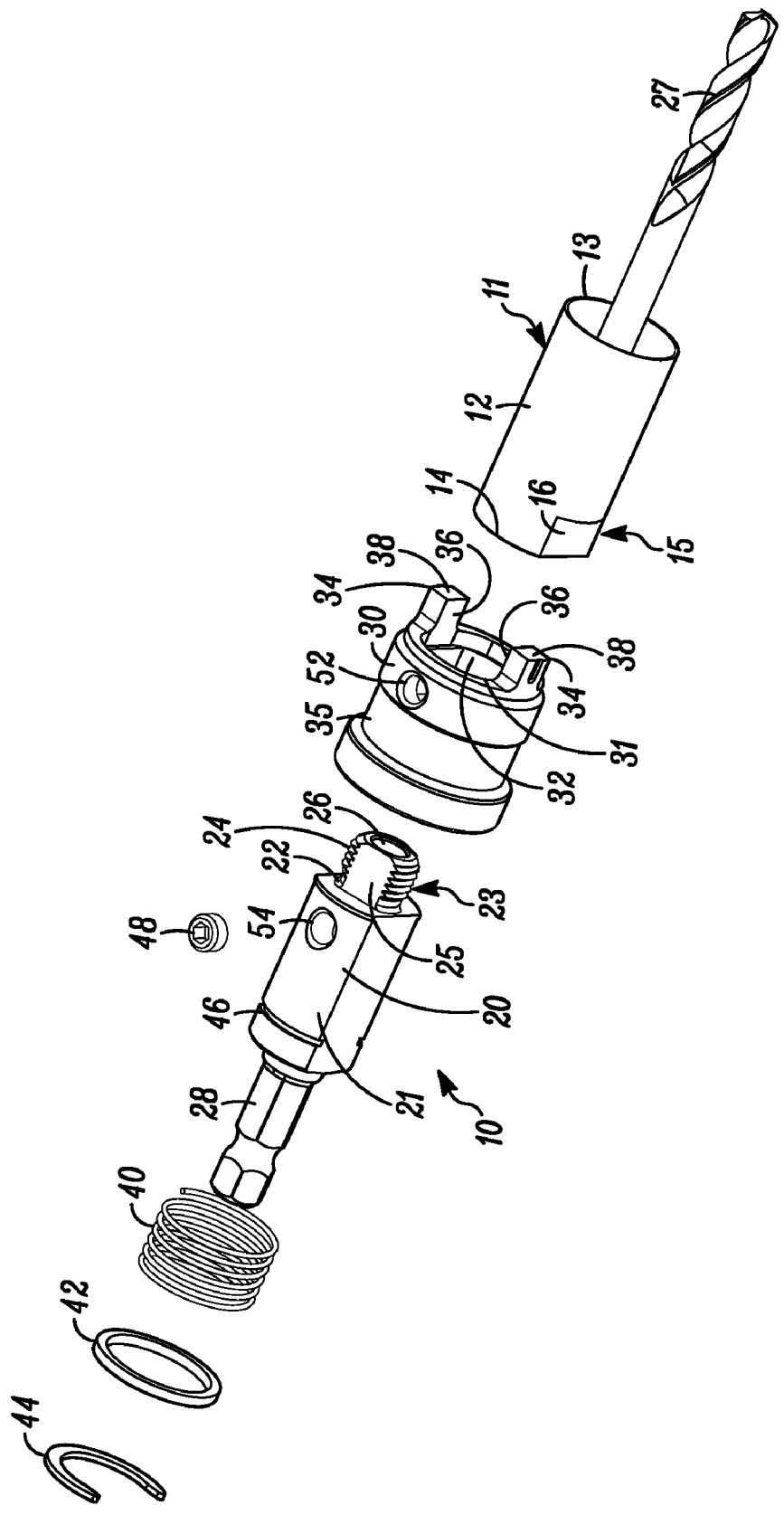
FIG. 2 is an exploded perspective view of the arbor of FIG. 1.
Figure 11:
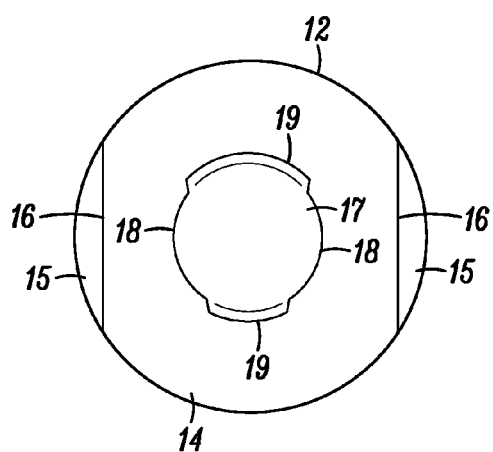
FIG. 11 is a top plan view of the end portion of an embodiment of a small diameter hole cutter of the present invention.

As shown, for example, in FIGS. 2 and 11, a typical small diameter quick change hole cutter 11 includes a blade body 12 including a cutting edge 13 at one end, and an end portion or end plate 14 at the other end opposite the cutting edge. The hole cutter 11 defines at least one drive pin recess 15. The term "recess" is used herein to mean any indentation, recessed surface, aperture, pocket, alcove, concavity, receding portion or space, or any other such feature that is capable of receiving therein and/or engaging a corresponding protuberance, such as a drive pin, for rotatably driving the hole cutter. In the illustrated embodiment, the hole cutter 11 defines two drive pin recesses 15, each extending axially from a point spaced axially inwardly from the cutting edge 13 through (and including) the end portion 14. In some such embodiments, the recesses 15 define a first substantially flat surface 16 for engaging a corresponding flat surface 36 of a respective drive pin 34 (described in further detail below). In some such embodiments, the hole cutter 11 defines two diametrically opposed recesses 15; however, as may be recognized by those of ordinary skill in the pertinent art base on the teachings herein, the hole cutter 11 can take any of numerous different configurations and can include any number of recesses 15 that can take any of numerous different configurations that are engageable with corresponding drive pins 34 of any form. The cutting edge 13 of the hole saw 11 defines a plurality of cutting teeth (not shown) for cutting a hole in a work piece by rotatably driving the arbor 10 and hole cutter 11 and moving the rotatably-driven cutting teeth into the work piece. The end portion 14 defines an approximately central aperture 17 extending therethrough. As described further below, in the quick change hole cutter, the central aperture 17 defines a plurality of raised threaded portions 18 that are angularly spaced relative to each other for threadedly engaging a connecting end portion 22 of the arbor 10, and a plurality of recessed unthreaded portions 19 located between the threaded portions.

In a conventional or standard small diameter hole cutter or saw (i.e. a hole cutter or saw having an outside diameter of less then 1¼ inches), the central aperture in the end portion of the hole cutter defines a continuous or substantially continuous thread extending about the circumference of the aperture. Such standard hole cutters conform to the ASME B94.54-1999 standard, and in accordance therewith, define a standard ½-20 UNF-2B thread. Accordingly, the term "standard" or "conventional" hole cutter is used herein to mean a hole cutter that has such a threaded aperture; whereas the term "quick change" hole cutter is used herein to mean a hole cutter that does not include such a conventional threaded aperture, but rather includes a connecting aperture defining one or more features to facilitate a quick change attachment of the hole cutter to the arbor, such as the plural raised engagement portions and plural recessed portions located therebetween and described further below.

Figure 7:
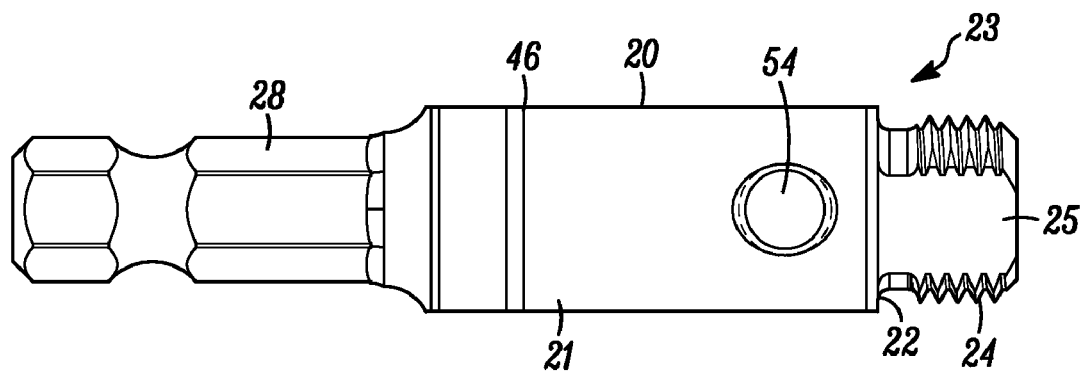
FIG. 7 is a side elevational view of the arbor body of the arbor of FIG. 1.
Figure 8:
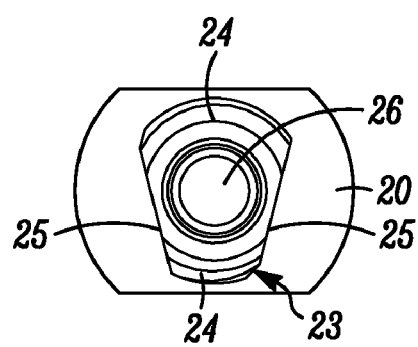
FIG. 8 is a front elevational view of the arbor body of FIG. 7.
Figure 13:
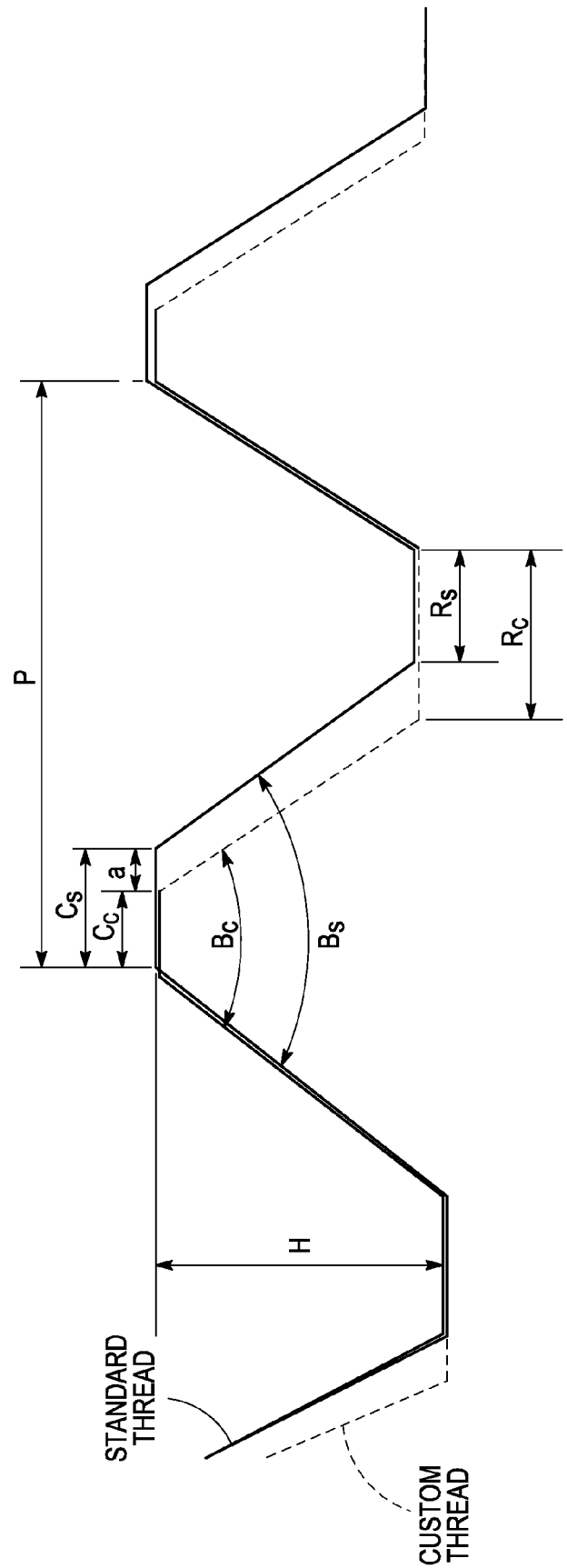
FIG. 13 is a somewhat schematic illustration of a standard hole cutter thread form shown in solid lines, and a custom hole cutter thread form in accordance with the currently preferred embodiments of the present invention shown in broken lines.
Figure 14:
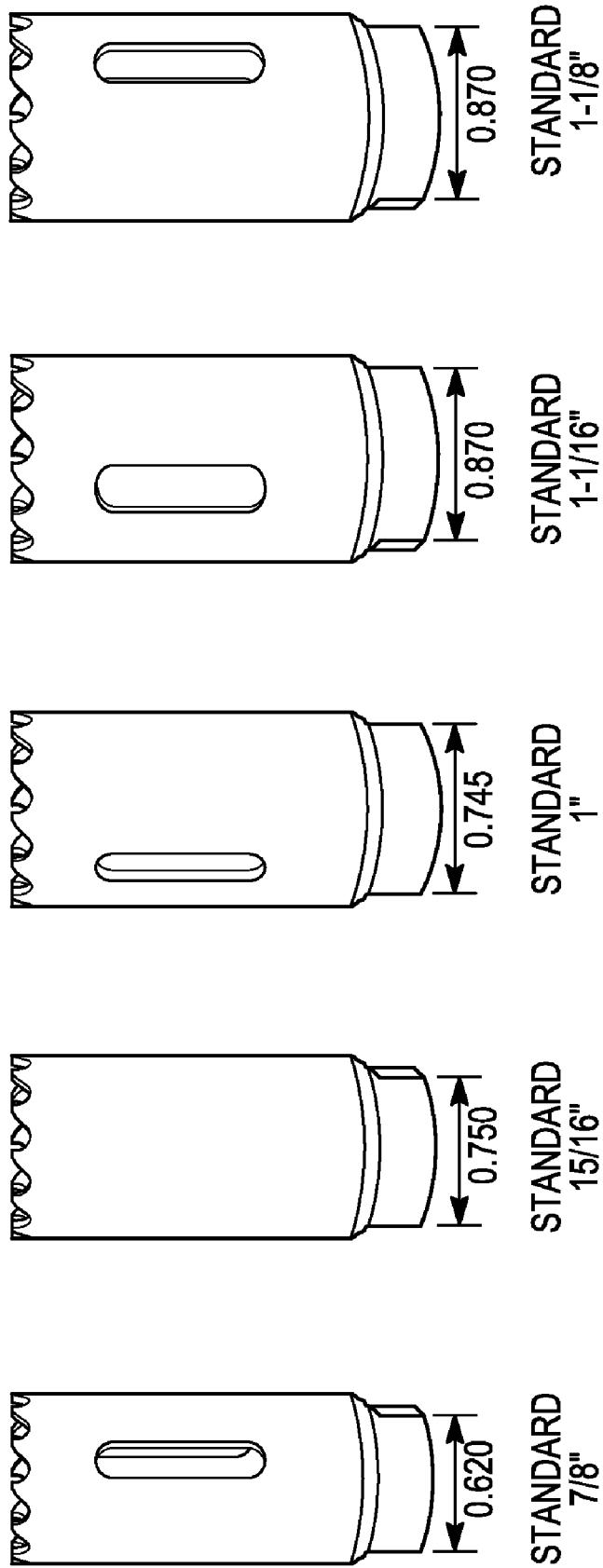
FIG. 14 is a side perspective view of a plurality of prior art small diameter hole cutters including wrench flats.

As shown best in FIGS. 2, 7 and 8, the arbor 10 comprises an axially-elongated arbor body 20 defining an axially extending pilot bit aperture 26 for receiving a pilot bit 27 (FIG. 13). Although a standard pilot bit is shown in the illustrated embodiment (i.e. a pilot bit that does not include a feature for allowing attachment of the bit to an arbor without tools), it should be noted that the arbor 10 can be configured to accept a quick change pilot bit (i.e. a pilot bit that includes a feature for allowing attachment of the bit to an arbor without tools). The arbor body 20 includes a body portion 21 defining a stop surface or shoulder 22, and an end portion 23 that extends axially from the stop surface 22. As described further below, the end portion 23 of the arbor is engageable within the central aperture 17 (FIG. 4) of the hole cutter 11 to secure the arbor body 20 to the hole cutter. In the illustrated embodiments, and as described further below, the end portion 23 threadedly engages the central aperture 17 of the hole saw; however, as may be recognized by those of ordinary skill in the pertinent art based on the teachings herein, any of numerous other connection mechanisms or features that are currently known, or that later become known, equally may be employed. As can be seen in FIG. 8, the body portion 21 of the arbor defines a "double D" cross-sectional configuration (i.e., a pair of opposing substantially flat side surfaces with a pair of opposing substantially curvilinear side surfaces extending therebetween); however, as may be recognized by those of ordinary skill in the pertinent art based on the teachings herein, this configuration is only exemplary, and numerous other shapes and/or configurations that are currently known, or that later become known equally may be used. A drive shank 28 is formed on the arbor body 20 opposite the end portion 23. In the illustrated embodiment, the drive shank 28 is a quick-release power drive shank of a type known to those of ordinary skill in the pertinent art. However, as may be recognized by those of ordinary skill in the pertinent art based on the teachings herein, the shank 28 may take the form of any of numerous different types of shanks or other structures that are currently known, or that later become known for performing the function of the shank 28.

Figure 3:
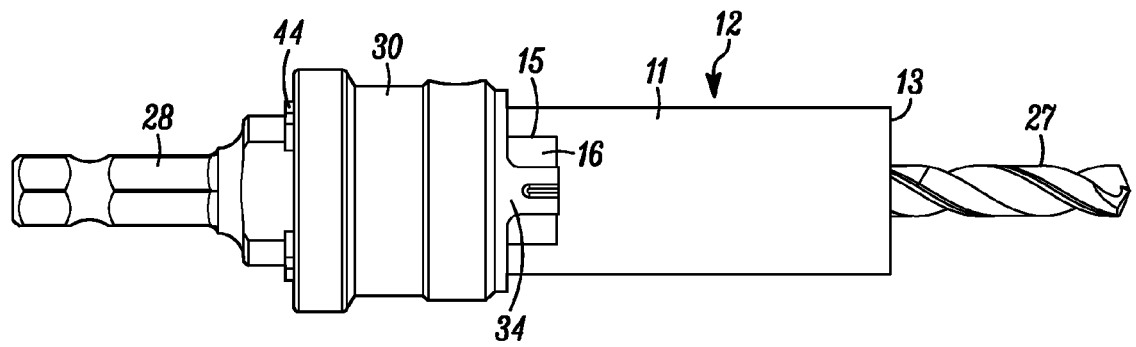
FIG. 3 is a side elevational view of the arbor of FIG. 1.
Figure 9:
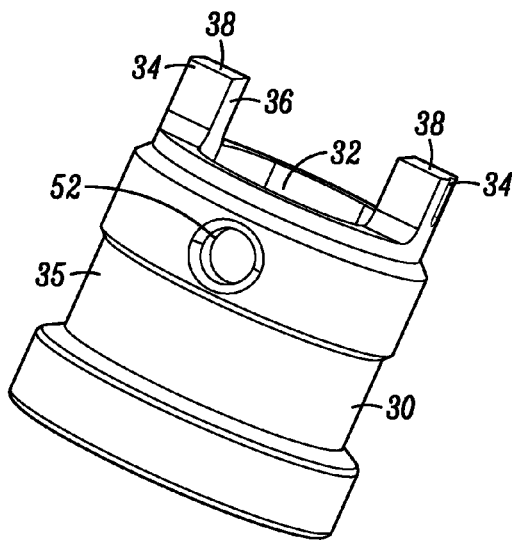
FIG. 9 is a perspective view of the drive member of the arbor of FIG. 1.
Figure 10:
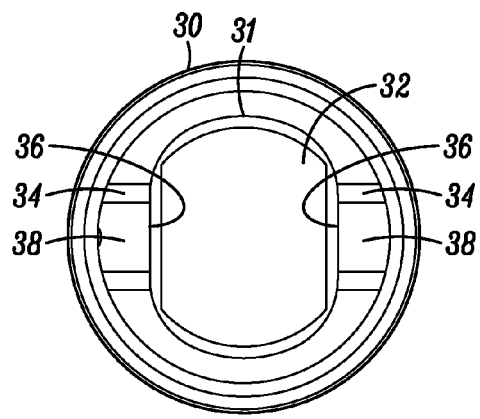
FIG. 10 is a bottom plan view of the drive member of FIG. 9.
Figure 12A:
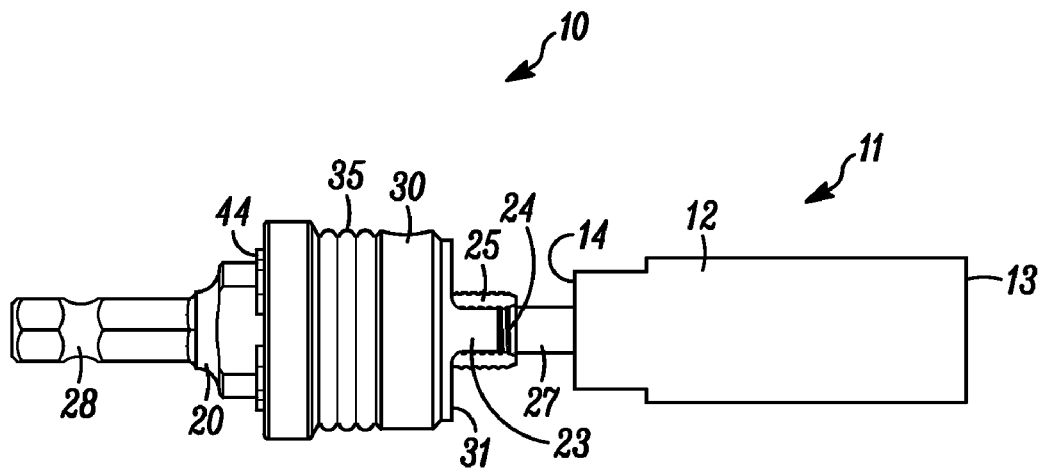
FIG. 12A is a side elevational view of the arbor of FIG. 1 showing the hole cutter in alignment with the end portion of the arbor body and ready for attachment thereon.
Figure 12B:
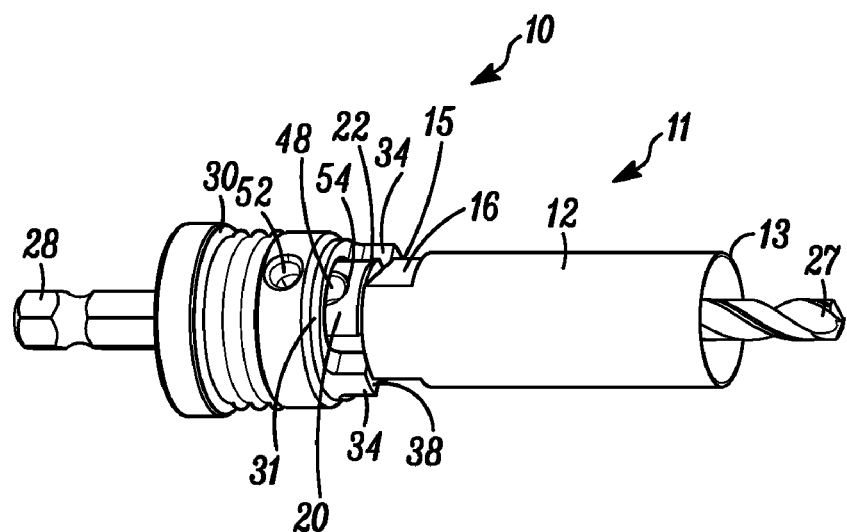
FIG. 12B s a side perspective view of the arbor of FIG. 12A showing the hole cutter and arbor body in the first engagement position.
Figure 12C:
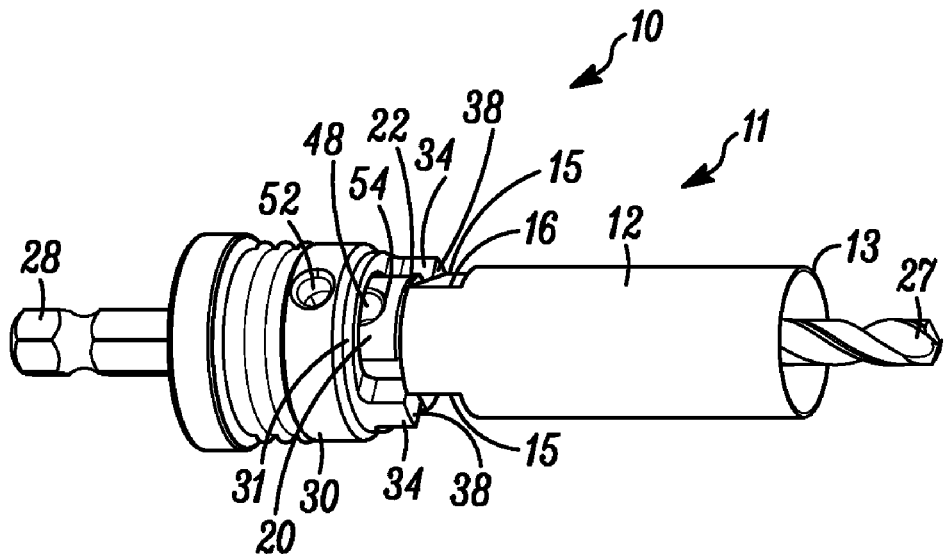
FIG. 12C is a side perspective view of the arbor of FIG. 12B showing the hole cutter and arbor body between the first and second engagement positions.
Figure 12D:
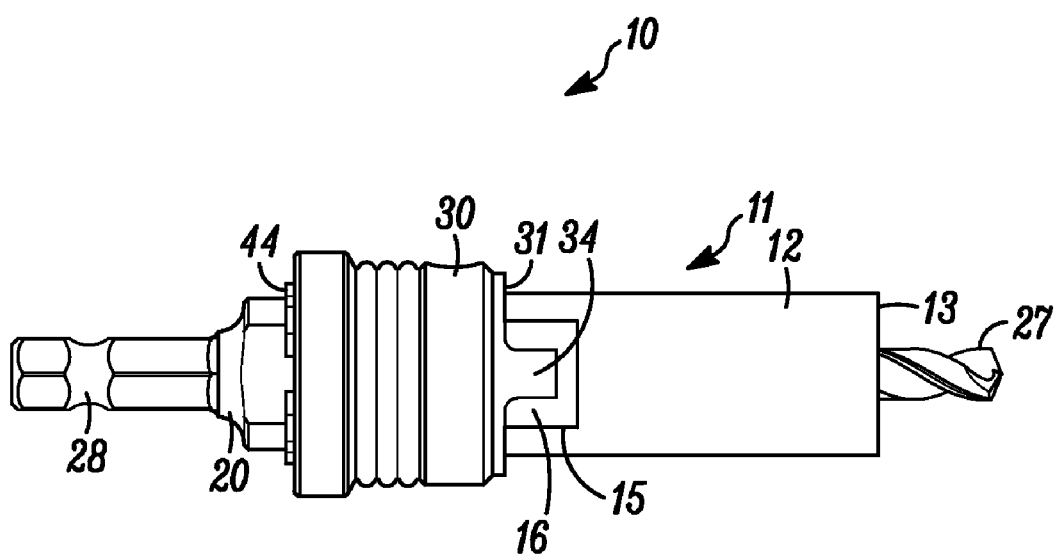
FIG. 12D is a side elevational view the arbor of FIG. 12C showing the hole cutter and arbor body fully engaged in the second engagement position.

As shown typically in FIGS. 1-6 and 9-10, the arbor 10 further includes a drive member 30 defining an aperture 32 extending therethrough. The aperture 32 is configured for receiving the arbor body 20 and engaging the body portion 21 of the arbor body such that the drive member 30 is prevented from rotating relative to the arbor body 20, but is allowed to move axially over the arbor body between a first or engaged position engaging the hole cutter 11 (FIG. 1), and a second or disengaged position disengaged from the hole cutter 11 (FIG. 12A). As best shown in FIG. 10, the aperture 32 defines a "double D" configuration to matingly engage the body portion 21 of the arbor body 20; however, as may be recognized by those of ordinary skill in the pertinent art based on the teachings herein, this configuration is only exemplary, and numerous other shapes and/or configurations that are currently known, or that later become known equally may be used. The drive member 30 further includes a first surface or bearing surface 31, and at least one drive pin 34 extending axially therefrom. The term "drive pin" is used herein to mean any protuberance for engaging a corresponding recess on a hole cutter and rotatably driving the hole cutter. As may be recognized by those of ordinary skill in the pertinent art base on the teachings herein, the at least one drive pin 34 can take any of numerous different shapes and/or configurations that are currently known, or that later become known. For example, the drive pins can take on cylindrical, circular, or other curvilinear shapes, or rectangular, square, or other rectilinear shapes, or combinations of any such shapes, and can include surface features to facilitate engaging and/or driving the hole cutters, such as flats or protrusions that engage corresponding recessed surfaces (or vice versa). In the illustrated embodiment, the drive pins 34 define a substantially rectangular cross-sectional shape, extend axially from the first surface 31, are diametrically opposed, and are radially spaced relative to the aperture 32. Each drive pin 34 is received within a corresponding drive pin recess 15 of the hole cutter 11 when the drive member 30 is in the engaged as shown in FIGS. 1, 3 and 12D, and is displaced from its respective recess 15 when the drive member is in a disengaged position as shown in FIGS. 12A-C. In some embodiments, each drive pin 34 defines a second substantially flat surface 36 that opposes and engages the first substantially flat surface 16 of the corresponding drive pin recesses 15 in the hole cutter 11 when the drive member 30 is in the engaged position to substantially prevent any relative rotational movement or play between the drive pins and hole cutter. In the illustrated embodiment, the drive member 30 includes two diametrically opposed drive pins 34; however, as may be recognized by those of ordinary skill in the pertinent art base on the teachings herein, the drive member 30 can take any of numerous different configurations and can include any number of drive pins 34 for rotatably driving the hole cutter.

As shown in FIG. 2, a biasing member 40, which in the illustrated embodiment is a coil spring, biases the drive member 30 in the direction from the disengaged position toward the engaged position. As described in further detail below, the biasing member 40 normally biases the drive member 30 into the engaged position when the drive pins 34 and corresponding drive pin recesses 15 are placed in alignment and support the hole cutter 11 in a manner that substantially prevents off-axis wobble and undesirable vibrations during use. One advantage of this feature is that it facilitates one-handed attachment of the hole cutter 11 to the arbor 10, or otherwise facilitates rapid attachment and detachment of the hole cutter to and from the arbor. As described further below, in the currently preferred embodiments of the present invention, the drive member 30 abuts or substantially abuts the end portion 14 of the hole cutter 11.

In the illustrated embodiments of the present invention, the arbor 10 is adapted to receive and mount both quick change hole cutters and standard hole cutters. However, the invention and aspects thereof may be embodied in arbors adapted to mount only quick change hole cutters. In a standard small diameter hole cutter (not shown), the threaded aperture in the end plate of the hole cutter (defining a ½-20 UNF-2B thread in accordance with the above-mentioned ASME standard) threadedly engages the end portion 23 of the arbor body 20 to secure the arbor body thereto. In the quick change hole cutter 11, on the other hand, and as shown typically in FIG. 10, the central aperture 17 in the end portion 14 defines a plurality of curvilinear protrusions 18 angularly spaced relative to each other along the circumference of the aperture, and a plurality of curvilinear recesses 19 located therebetween. The curvilinear protrusions 18 define female threads that threadedly engage corresponding male threads formed on the end portion 23 of the arbor body 20. More specifically, and as shown in FIGS. 7 and 8, the end portion 23 of the arbor body 20 defines a plurality of angularly extending, curvilinear arbor protrusions 24 that project radially outwardly, and are angularly spaced relative to each other about the circumference of the end portion 23, and a plurality of angularly extending recesses or flats 25 located therebetween. In the illustrated embodiment, one or more of the protrusions 24 on the arbor body 20 and the corresponding protrusions 18 on the hole cutter 11 defines a greater or lesser angular extent than the other protrusions so that the quick change hole cutter can be fitted to the end portion 23 of the arbor body in only one first engagement position, and in that first engagement position, the lead male and female threads can properly engage when moving from the first engagement position to the second engagement position. Similarly, the end portion 14 of the hole cutter 11 of FIG. 10 includes a first recess 19 defining a greater angular extent than the opposite second recess 19. Accordingly, in the first engagement position, the first recess 19 receives the first protrusion 24, the second recess 19 receives the second protrusion 24, and this is the only position in which the end portion 23 of the arbor can be received within the central aperture 17 of the hole cutter 11. In this first engagement position, the lead threads of the respective protrusions of the arbor 10 and hole cutter 11 engage upon moving at least one of the hole cutter 11 and arbor body 20 relative to the other between the first and the second engagement positions. Because of the different angular extents of the opposing threaded protrusions of the central aperture 17 of the cutter 11 and the end portion 23 of the arbor body 20, the end portion 23 can be received into the central aperture 17 in only one position, and in that position, the lead male and female threads can engage upon moving the hole cutter and/or arbor body relative to the other between the first and second engagement positions. If desired, or alternatively, the hole cutter and/or arbor can include visual markings thereon that can be aligned or otherwise used to orient the position of the central aperture 17 of the hole cutter relative to the connecting portion of the arbor in order to ensure attachment of the hole to the arbor in the first engagement position.

As shown in FIGS. 12A through 12D, in order to attach the hole cutter 11 to the arbor body 20, the protrusions 24 on the end portion 23 of the arbor body 20 are aligned with the correspondingly-sized recesses 19 of the central aperture 17 of the hole cutter. Then, the hole cutter 11 is slipped over the end portion 23 of the arbor body 20 (or vice versa) until the end portion 14 of the hole cutter is adjacent to, substantially in contact with, or in contact with the shoulder (or stop surface) 22 of the arbor body 20 to thereby place the hole cutter and arbor body in the first engagement position. As indicated above, in this position, the lead male threads of the arbor body and lead female threads of the hole cutter can engage upon rotating at least one relative to the other. Then, the hole cutter 11 is rotated relative to the arbor body 20 from the first engagement position to a second engagement position (or the arbor body is rotated relative to the hole cutter, or both the hole cutter and arbor body are rotated in opposite directions) to, in turn, threadedly engage the male threaded protrusions 24 of the end portion 23 of the arbor body with the corresponding female threaded protrusions 18 of the hole cutter, and thereby fixedly secure the hole cutter to the arbor body.

In the illustrated embodiment, the male threads of the arbor body protrusions 24 and the female threads of the hole cutter protrusions 18 are configured (or "clocked") so that when the hole cutter and/or arbor body is rotated from the first engagement position to the second engagement position, the drive pins 34 of the drive member 30 and recesses 15 of the hole cutter are substantially aligned in the second engagement position. This, in turn, allows the drive pins 34 to be axially received within the corresponding drive pin recesses 15. In one such embodiment, the respective first and second substantially flat surfaces 16 and 36 also engage to further secure the hole cutter to the arbor and prevent rotational movement of the hole cutter relative to the drive member 30. In a preferred embodiment, the male and female threads of the protrusions 24 and 18, respectively, are configured so that when the hole cutter 11 and/or the arbor body 20 are rotated into the second engagement position, the end portion 14 of the hole cutter is in contact with, or substantially in contact with the shoulder 28 of the arbor body to, in turn, allow the shoulder 28 to engage and further support the hole cutter during use. In the illustrated embodiments of the present invention, there is sufficient axial clearance between the male and female threads of the protrusions 24 and 18, respectively, to allow the end portion 14 of the hole cutter 11 to contact or substantially contact the shoulder 28 of the arbor body 20 in the first engagement position, and to allow the end portion 14 of the hole cutter to remain in contact or substantial contact with the shoulder 28 during rotation between the first and second engagement positions, so that in the second engagement position, the end portion 14 is in contact with, or in substantial contact with the shoulder 22 of the arbor body 20. During rotation between the first and second engagement positions, the threads tend to drive the hole cutter 11 axially inwardly toward the shoulder 22 (or vice versa) and thus substantially eliminate or eliminate the axial clearance between threads in the second engagement position.

As indicated above, one advantage of the currently preferred embodiments of the present invention is that the threaded end portion 23 of the arbor is threadedly engageable with either (i) quick change hole cutters, or (ii) standard hole cutters, as described above. The combination of threaded protrusions 24 on the end portion 23 of the arbor body 20 forms an interrupted, but continuous thread pattern for engaging the female threads on a standard hole cutter having a diameter less than 1¼ inches as defined above (i.e., a ½-20 UNF-2B thread). Thus, in order to attach a standard hole cutter to the arbor body, the threaded aperture in the standard hole cutter cap is fitted over the threaded end portion 23 of the arbor body, and at least one of the hole cutter and arbor body is rotated relative to the other to engage the threads. Then, the hole cutter and/or arbor is rotated relative to the other to further engage the threads and, in turn, axially move the end portion 14 of the hole cutter into engagement with the shoulder 28 of the arbor body. However, unlike quick change hole cutters, when a standard hole cutter is threadedly attached to the arbor, the drive member 30 will remain in a downward disengaged position and the top surfaces 38 of the respective drive pins will contact, but not engage, the end portion of the standard hole cutter.

In the currently preferred embodiments of the present invention, the relative rotation of the hole cutter 11 and/or arbor 10 between the first and second engagement positions is within the range of about 10 degrees and about 180 degrees, is preferably within the range of about 30 degrees and about 120 degrees, and is most preferably within the range of about 40 degrees and about 100 degrees. In the illustrated embodiment, the relative rotation between the first and second engagement positions is about 90 degrees. However, as may be recognized by those of ordinary skill in the pertinent art based on the teachings herein, these angular ranges and angles are only exemplary, and numerous other angles and/or angular ranges equally may be employed.

As shown typically in FIG. 13, the arbors and hole cutters of the currently preferred embodiments of the present invention define custom thread forms that allow the end portions of the arbors to be threadedly engaged to both quick change hole cutters and standard hole cutters; that allow the quick change hole cutters to engage or substantially engage the shoulder of the arbor in both the first and second engagement positions; and that are timed so that in the second engagement position the drive pins of the arbor are aligned or substantially aligned with the drive pin recesses of the hole cutter. As indicated above, standard hole cutters having hole saw diameters of less than 1¼ inches define a ½-20 UNF-2B thread. Accordingly, the custom thread form of the currently preferred embodiment of the present invention is based on this standard thread form to allow attachment of the arbor to hole cutters with such standard threads; however, the custom thread form also varies from the standard thread form in order to allow attachment of quick change hole cutters as described. The currently preferred small diameter hole cutter embodiments of the present invention define a "½-20 custom thread". Each custom thread defines a thread height "H", pitch "P", and included angle as does the respective standard thread form, but defines a different axial clearance "a", root "R", and crest "C". In the illustrated embodiments, the customer thread form differs from the standard thread form as follows:

TABLE 1

| Different Features | Standard Thread Forms | Custom Thread Forms |
| --- | --- | --- |
| Root ("R") | 0.25 P | 0.25 P + a |
| Crest ("C") | 0.125 P | 0.125 P − a |
| Axial Clearance | Not Specified, But Negligible or Approximately Zero | a |

The minimum clearance "a" for each custom thread form is preferably determined in accordance with the following formula: $a=((1/pitch)/360))*D$, where D equals the degree of rotation between the first and second engagement positions.

For example, as indicated in the table below, if the hole cutter includes two threaded protrusions 18 (or "lobes"), it will rotate 90° between the first and second engagement positions; if the hole cutter includes 3 lobes, it will rotate 60° between the first and second engagement positions; if the hole cutter includes 4 lobes, it will rotate 45° between the first and second engagement positions, etc. The minimum axial clearance "a" is set to time the threads so that in the second engagement position the drive pins are aligned or substantially aligned with the respective drive pin recesses in the hole cutter to allow the drive pins to be moved into the engaged position. The following table lists exemplary minimum approximate clearances "a" for the ½-20 custom thread forms:

TABLE 2

| Number of Lobes (or curvilinear threaded protrusions) | Angular Rotation Between First And Second Engagement Positions | Minimum Approximate Clearance "a" for ½-20 Custom Thread Form (inches) |
|---|---|---|
| 2 lobe (square/rectangle) | 90° | 0.012 |
| 3 lobe (triangle) | 60° | 0.008 |
| 4 lobe (cross) | 45° | 0.006 |
| 5 lobe (pent) | 36° | 0.005 |
| 6 lobe (hex) | 30° | 0.004 |

As may be recognized by those of ordinary skill in the pertinent art based on the teachings herein, these minimum clearances are only exemplary, and numerous other clearances equally may be employed. Preferably, the minimum clearance "a" is approximately as defined above; however, if desired, the clearance may be greater than the minimum as defined above. In some embodiments of the present invention, the clearance is within the range of about 1 to about 1½a. If, for example, the clearance is greater than the respective minimum clearance "a", the drive pins will be allowed to move into the drive pins recesses when the hole cutter is located in the second engagement position. If, on the other hand, the clearance is too small such that the hole cutter cannot move into the second engagement position and thus cannot move the drive pin recesses into alignment with the drive pins, the hole cutter cannot be properly attached to the arbor.

Figure 4:
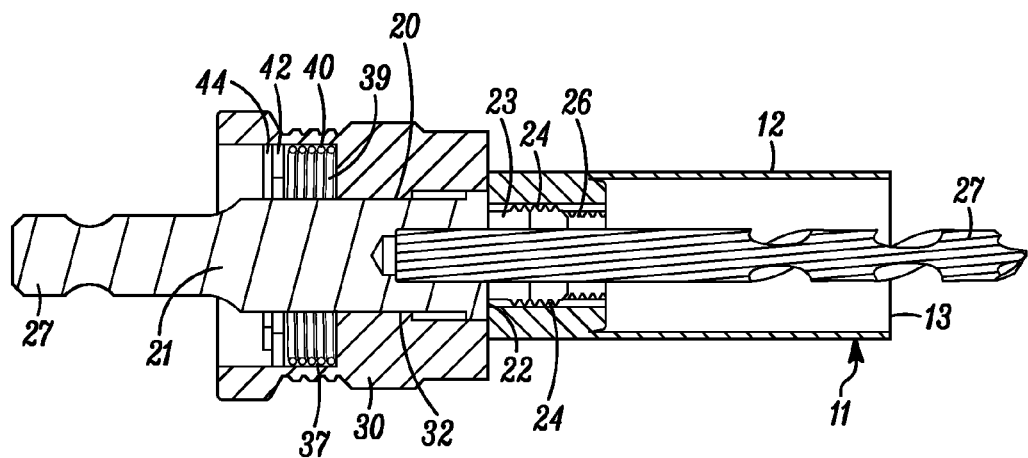
FIG. 4 is a cross-sectional view of the arbor of FIG. 1.
Figure 5:
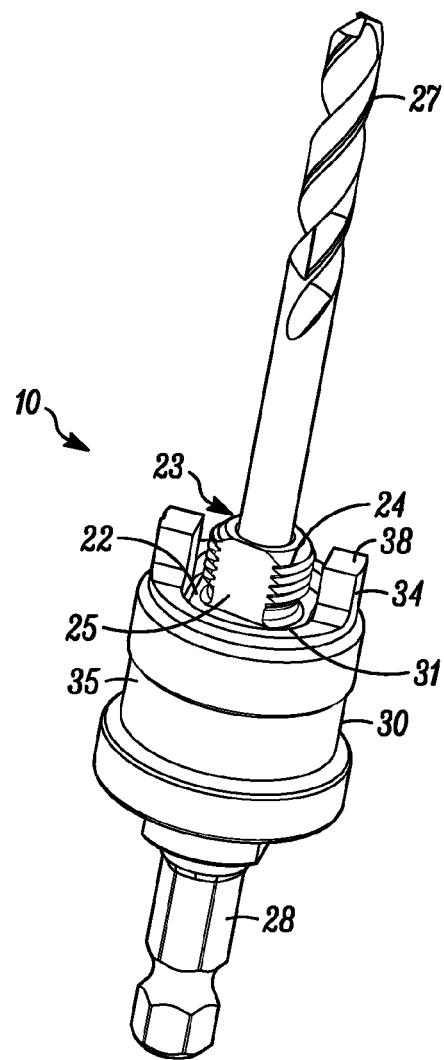
FIG. 5 is a perspective view of the arbor of FIG. 1 with the hole cutter removed.
Figure 6:
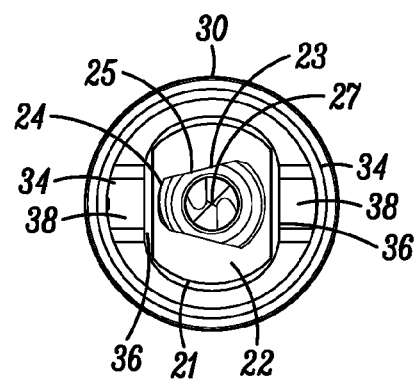
FIG. 6 is a top plan view of the arbor of FIG. 5.

As shown typically in FIGS. 4, 9 and 10, the drive member 30 defines a peripheral, axially-extending side wall 35 and a bore 37 (FIG. 4) formed on the inner side of the side wall 35. The inner bore 37 of the drive member 30 and the body portion 21 of the arbor body 20 define an annular, axially-extending compartment 39 for receiving and supporting therein the first biasing member 40 which, in the illustrated embodiment, is a coil spring. As shown best in FIGS. 2 and 4, the arbor 10 includes a retaining clip or ring 44 connectable to a groove 46 formed in the body portion 21 of the arbor body 20, a bushing 42 that engages on its end surface the clip 44, and slidably engages on its outer surface the bore 37 of the drive member 30 to guide the axial movement of the drive member 30 between the engaged (FIGS. 2 and 12D) and disengaged (FIG. 12A) positions. As can be seen, the first biasing member 40 is axially fitted between the bushing 42 and the inner end of the drive member 30 to normally bias the drive member outwardly into the engaged position. As described further below, a user can manually engage the drive member 30 to retract the drive member against the bias of the first biasing member 40 into the disengaged position and can, in turn, release the drive member to allow the first biasing member to drive the drive member from the disengaged to an engaged position. Alternatively, for one-handed attachment, a user can press the end portion 14 of the hole cutter against the drive member 30 to, in turn, correspondingly compress the coil spring 40 and place the hole cutter against the shoulder 28 of the arbor in the first engagement position. Then, upon rotating the hole cutter with the same hand from the first engagement position into the second engagement position, the coil spring automatically drives the drive member 30 into the engaged position with the drive pins 34 received within the corresponding drive pin recesses 15 of the hole cutter to complete attachment of the hole cutter to the arbor.

Having thus described the arbor 10 and its components, attention will now be drawn to a method of attaching and removing hole cutters to and from the arbor, respectively. With the drive shank 28 of the arbor 10 inserted and engaged by the chuck of a driving tool, such as a drill (not shown) or, prior to insertion and engagement with the tool, the end user aligns the central aperture 17 of the hole cutter 11 with the end portion 23 of the arbor. If a small diameter quick change hole cutter is used, the hole cutter recesses 18 are aligned with the arbor body protrusions 24 as shown, for example, in FIG. 12A. Once in alignment, the hole cutter is fitted onto the end portion 23 of the arbor body 20 such that the arbor body protrusions 24 are received within the corresponding hole cutter recesses 18, and the end portion or base 14 of the hole cutter 14 rests on or about the stop surface or shoulder 28 of the arbor body 20. During this step, the user substantially simultaneously moves the drive member 30 from the first (engaged) position to the second (disengaged) position and compresses the first biasing member 40. At this point the hole saw and arbor are in the first engagement position as shown in FIG. 12B. Referring to FIGS. 12B through 12D, the hole cutter 11 is then rotated from the first engagement position (FIG. 12B) to the second engagement position (FIG. 12D) such that the hole cutter protrusions 19 threadedly engage the respective arbor body protrusions 24 and, in turn, releasably connect the hole cutter 11 to the arbor body 20. When the hole cutter and arbor body are in the second engagement position, the drive pin recesses 15 of the hole cutter are substantially aligned with the respective drive pins 34 of the drive member 30, thereby allowing the first biasing member 40 to automatically drive the drive member 30 from the second position (FIG. 12A) to the first position (FIG. 12D) and, in turn, drive the drive pins 34 into the corresponding recesses 15 in the hole saw. In the illustrated embodiment, with the drive pins 34 fully received into the corresponding drive pin recesses 15, the first and second substantially flat drive pin surfaces engage to further prevent movement of the hole cutter 11 relative to the drive member 30 such that the hole cutter 11 is fully engaged and attached to the arbor as shown, for example, in FIG. 1.

If a standard small diameter hole cutter (not shown) is used, the end user aligns the central aperture of the cutter with the end portion 23 of the arbor body 20 fitting the hole cutter thereupon, such that the central aperture threadedly engages the threads on the arbor protrusions 24. Like the quick change hole cutter, the standard hole cutter is then rotated to threadedly attach the hole cutter to the end portion of the arbor to connect the hole saw to the arbor. However, as noted above, the drive member 30 will remain in the downward disengaged position and the top surfaces 38 of the respective drive pins will contact, but not engage, the end portion of the standard cutter. Depending on the thread form, the standard hole cutter may or may not fully engage the shoulder or stop surface 38 of the arbor body 20 when attached to the arbor.

To attach a standard or quick change pilot bit, the bit is inserted into a pilot bit aperture 26 defined in the arbor body 20. The drive member 30 is then moved by at least one of: (i) grasping and physically moving the drive member 30, and (ii) pressing downward on the drive member 30 through engagement with the hole cutter 11 during the step of fitting the hole cutter onto the end portion of the arbor body, to align a fastener aperture 52 in the drive member 30 with a corresponding fastener aperture 54 in the arbor body 20. The fastener aperture in the arbor body 52 is threaded to engage a threaded fastener 56. The fastener 56 is then rotated to, in turn, move from a first position disengaged form the pilot bit to a second position engaged with the pilot bit (FIG. 4) to thereby prevent axial movement and rotation of the pilot bit (for example, pilot bit 27) relative to the arbor body 20. As may be recognized by those of ordinary skill in the pertinent art based on the teachings herein, the order in which the pilot bit is inserted and the drive member is moved is inconsequential; hence, the drive member may be moved to align the apertures 52, 54 either before or after the pilot bit is inserted. Additionally, if desired, the arbor can be used with the hole cutter only (no pilot bit) or with the pilot bit only (no hole cutter).

Figure 15:
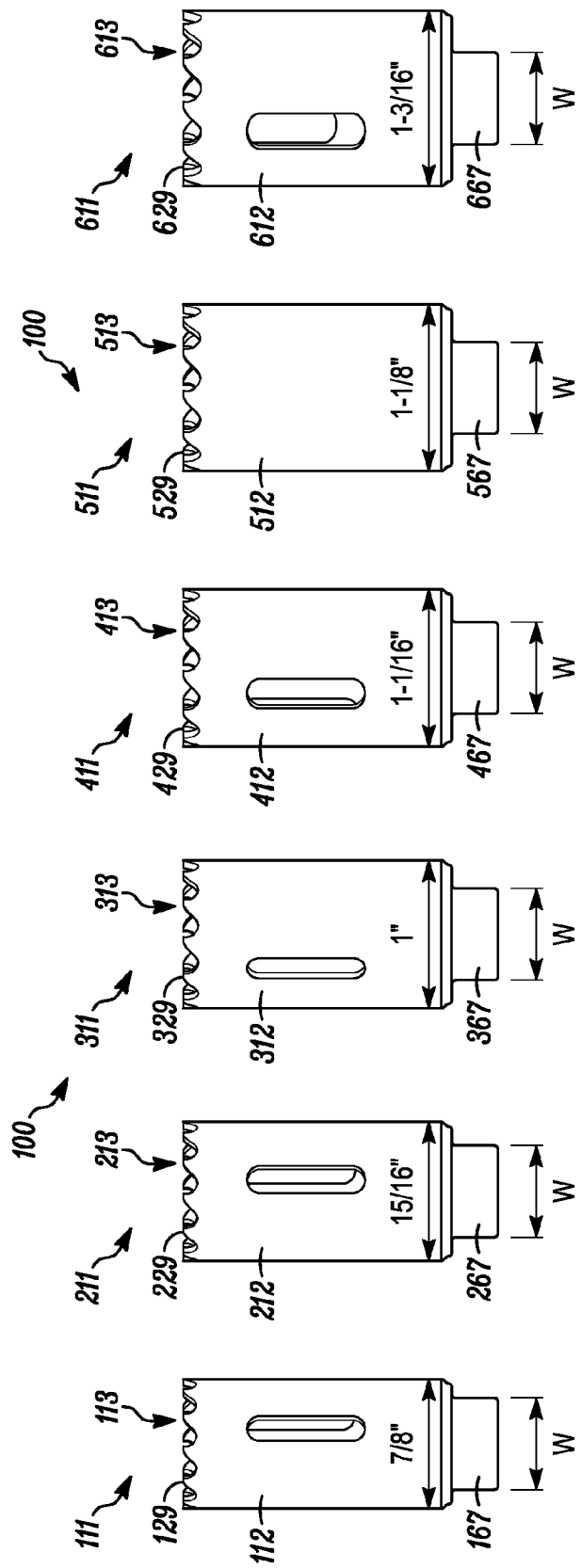
FIG. 15 is a side perspective view of a plurality of small diameter hole cutters according to the present invention.
Figure 16:
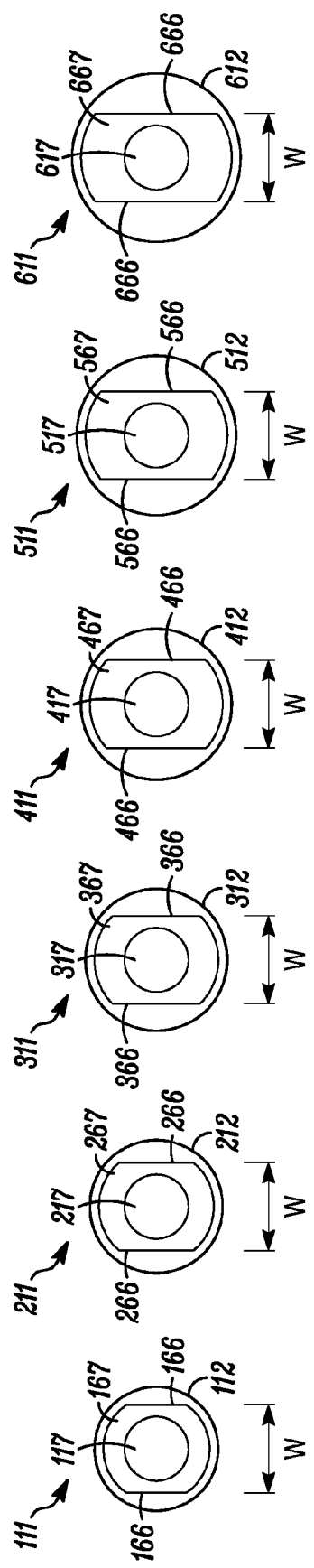
FIG. 16 is a bottom elevational view of the hole cutters shown in FIG. 15.

Referring now to FIGS. 15-16, a plurality of small diameter hole cutters according to another embodiment of the present invention is indicated generally by the reference numeral 100. The illustrated hole cutters can be driven by an arbor, such as the arbor 10 described above, and are substantially similar to the hole cutter 11 described above, and therefore like reference numerals preceded by the numerals "1", "2", "3", "4", "5" or "6", respectively, are used to indicate like elements. The primary difference of the hole cutters 111, 211, 311, 411, 511 and 611 in comparison to hole cutter 11 is that the hole cutters 111, 211, 311, 411, 511 and 611 define a pair opposing drive surfaces, which in the illustrated embodiment are substantially flat surfaces, 166, 266, 366, 466, 566 and 666, respectively, defining a constant distance or width (w) therebetween as described in further detail below. As shown in FIGS. 15-16, each hole cutter 111, 211, 311, 411, 511, 611 includes a blade body 112, 212, 312, 412, 512, 612, respectively, defining an outer diameter including a cutting edge 113, 213, 313, 413, 513, 613, respectively, defined by a plurality of cutting teeth 129, 229, 329, 429, 529, 629, respectively, and a base portion 167, 267, 367, 467, 567, 667, respectively, at the other end opposite the cutting edge. The base portion defines a base surface or end portion 114, 214, 314, 414, 514, 614, respectively, that may engage the corresponding stop surface 22 of the arbor 10, and an approximately central threaded aperture 117, 217, 317, 417, 517, 617, respectively, adapted for threadedly engaging the corresponding threaded end portion 23 of the arbor 10 to secure the respective hole cutter to the arbor. In the illustrated embodiments, the blade bodies define outer diameters of about ⅞ inch, about 15/16 inch, about 1 inch, about 1 1/16 inches, about 1⅛ inches and about 1 3/16 inches, respectively. However, it should be noted that the sizes shown are by way of example only and, therefore, the invention covers all sizes of small diameter hole cutters that are currently know or that later become known, having an outside diameter of less than 1¼ inches. For example, the plurality of hole cutters may include without limitation additional hole cutters having blade bodies defining outer diameters of about 9/16 inch, about ⅝ inch, about 11/16 inch, about ¾ inch, about 25/32 inch, and about 13/16 inch.

As previously indicated, the base portion 167, 267, 367, 467, 567, 667 of each cutter 111, 211, 311, 411, 511, 611, respectively, further defines at least two opposing drive surfaces 166, 266, 366, 466, 566, 666, respectively, that are radially spaced relative to the respective central aperture 117, 217, 317, 417, 517 or 617. The substantially flat surfaces of the illustrated embodiment are designed for engaging corresponding drive members or pins of an arbor, such as the pins 38 of the arbor 10 described above. Also, as previously indicated, the width (w) between the opposing drive surfaces is substantially the same for each of the hole cutters shown, and is also substantially the same for all small diameter hole cutter sizes not shown that are included in the given plurality or set of hole cutters. One advantage of this arrangement is that each hole cutter in the plurality of hole cutters can be driven off of the same arbor. The distance or width (w) is preferably within the range of about ¼ inch to about 1 inch, and more preferably is within the range of about ⅜ inch to about ¾ inch. In the illustrated embodiment, the distance or width (w) is about ⅝ inch. Also in the illustrated embodiment, the opposing drive surfaces are diametrically opposed; however, it should be noted that the drive surfaces could be circumferentially or otherwise spaced at other locations along the perimeter of the base portion, so long as the distance between the central points of the surfaces or otherwise between the drive surfaces is substantially the same for every hole cutter size in the given plurality or set of hole cutters. It should also be noted that the end portions of the hole cutters 111, 211, 311, 411, 511, 611 could define additional pairs of drive surfaces, such as additional pairs of substantially diametrically opposed and/or substantially flat surfaces, so long as the distance or width (w) between the additional pairs of surfaces is substantially the same for every hole cutter size in a given plurality of hole cutters to allow for use of the same arbor to drive the plurality of hole cutters.

Having thus described the hole cutters 111, 211, 311, 411, 511, 611 and arbor 10, attention will now be drawn to a method of attaching and removing the hole cutters to and from the arbor, respectively. With the drive shank 28 of the arbor 10 inserted and engaged by the chuck of a driving tool, such as a drill (not shown) or, prior to insertion and engagement with the tool, the end user aligns the central aperture 117, 217, 317, 417, 517, 617 of the respective hole cutter with the end portion 23 of the arbor body, fitting the hole cutter thereupon, such that the central aperture threadedly engages the threads on the end portion of the arbor 10. Substantially simultaneously, the end user grasps the drive member 30 to maintain the drive member in the disengaged position. The hole cutter is then rotated to threadedly attach the hole cutter to the end portion of the arbor to connect the hole cutter to the arbor. When the hole cutter is completely threaded (or approximately completely threaded) upon the end portion of the arbor, and the drive surfaces 166, 266, 366, 466, 566, 666 of the respective hole cutter are aligned with the substantially flat surfaces 36 of the drive pins 34 (or other drive members of a different style or configured arbor), the end user releases the drive member 30 so that the drive member 30 moves into the engaged position so that the drive pins 34 engage the respective hole cutter. Alternatively, the drive member is not spring biased, the user can manually grasp and move the drive member axially from the disengaged into the engaged position. In this manner, all hole cutters 111, 211, 311, 411, 511, 611 may be driven by the drive pins or drive members of the arbor, and not the threaded end portion of the arbor, thereby preventing the hole cutters from locking up on the arbor threads. It should be noted that although the hole cutters illustrated in FIGS. 15-16 define a conventionally threaded central aperture as defined above, this should not be construed as a limiting factor, as the hole cutters may employ quick change features for attaching and removing the hole cutters in the manner previously described.

If desired, the arbors, hole cutters and methods disclosed herein, and/or aspects or features of the arbors, hole cutters and methods disclosed herein, maybe substantially similar to those disclosed in the following co-pending patent application that is assigned to the Assignee of the present invention, and is hereby expressly incorporated by reference as part of the present disclosure: U.S. patent application Ser. No. 12/043,740, filed Mar. 6, 2008, entitled: "Quick Change Arbor, Hole Cutter, and Method".

As may be recognized by those of ordinary skill in the pertinent art based on the teachings herein, numerous changes and modifications may be made to the above-described and other embodiments of the present invention without departing from the scope of the invention as defined in the appended claims. For example, the components of the arbor may take on any of numerous different configurations, or may be formed of any of numerous different materials, that are currently known, or that later become known; any of a variety of the disclosed components may be eliminated, or additional components or features may be added; and the arbors may be used with any of numerous different types of tools that are currently known, or that later become known. For example, the drive pins may take any of numerous different configurations including, for example, circular and/or rectangular drive pins that engage corresponding drive pin recesses and/or apertures in the hole cutter. Similarly, the recesses in the hole cutter can take any of numerous different configurations for receiving or otherwise engaging any of numerous different types of drive pins or drive members, such as the substantially flat recessed drive surfaces illustrated, curvilinear drive surfaces, or any of numerous other drive surface shapes or configurations that are currently known, or that later become known. The drive member likewise can take any of numerous different configurations, including, for example, a plate form, a circular, non-circular or other shaped drive member or housing that is movable relative to the arbor body and includes one or more drive pins. The threads on the arbor connecting portion and/or on the central aperture of the hole cutter can take any of numerous different configurations that are currently known, or that later become known. Alternatively, the connecting portion and/or central aperture of the hole cutter may define a structure other than threads for engaging the hole cutter to the arbor upon moving the arbor and/or hole cutter relative to the other between the first and second engagement positions. Accordingly, this detailed description of the currently-preferred embodiments is to be taken in an illustrative, as opposed to a limiting sense.

What is claimed is:

1. A plurality of hole cutters, each hole cutter comprising:
   a blade including a blade body defining a respective outer diameter of less than 1¼ inches and a cutting edge defined by a plurality of cutting teeth; and
   a base portion opposite the cutting edge and defining a threaded aperture adapted for threadedly engaging a corresponding threaded end portion of an arbor, and at least two drive surfaces radially spaced relative to the threaded aperture on substantially opposite sides of the threaded aperture relative to each other and defining a distance therebetween;
   wherein (i) the plurality of hole cutters includes at least two hole cutters having blade bodies defining different outer diameters relative to each other that are selected from the group consisting of: about ⅞ inch, about 1 inch, and about 1⅛ inches, and (ii) the distance between the drive surfaces is substantially the same for each of the plurality of hole cutters.

2. A plurality of hole cutters as defined in claim 1, wherein the plurality of hole cutters includes three hole cutters, one hole cutter including a blade body defining an outer diameter of about ⅞ inch, another hole cutter including a blade body defining an outer diameter of about 1 inch, and another hole cutter including a blade body defining an outer diameter of about 1⅛ inches.

3. A plurality of hole cutters as defined in claim 2, further comprising a plurality of additional hole cutters having blade bodies defining additional different outer diameters different relative to each other selected from the group consisting of: about 9/16 inch, about ⅝ inch, about 11/16 inch, about ¾ inch, about 25/32 inch, about 13/16 inch, about 15/16 inch, about 1 1/16 inches, and about 1 3/16 inches.

4. A plurality of hole cutters as defined in claim 3, wherein the outer diameter of the blade body of each hole cutter of the plurality of hole cutters is different than the outer diameter of the blade body of every other hole cutter in the plurality of hole cutters.

5. A plurality of hole cutters as defined in claim 1, wherein the distance between the drive surfaces is within the range of about ⅜ inch to about ¾ inch.

6. A plurality of hole cutters as defined in claim 5, wherein the distance between the drive surfaces is about ⅝ inch.

7. A plurality of hole cutters as defined in claim 1, wherein the two drive surfaces are located on diametrically opposite sides of the threaded aperture relative to each other.

8. A plurality of hole cutters as defined in claim 1, wherein each drive surface is recessed relative to a peripheral surface of the hole cutter.

9. A plurality of hole cutters as defined in claim 8, wherein each drive surface is substantially flat.

10. A plurality of hole cutters as defined in claim 1, wherein each hole cutter is attachable to an arbor including at least two drive members for engaging the at least two drive surfaces to rotatably drive the hole cutter with the arbor.

11. A plurality of hole cutters, wherein each cutter is attachable to an arbor including a threaded end portion, and at least two drive members radially spaced relative to the threaded end portion and movable axially, but not rotationally, relative to the threaded end portion between an engaged position with the drive members engaging a respective hole cutter to rotatably drive the hole cutter, and a disengaged position with the drive members disengaged from the hole cutter, each hole cutter comprising:
   a blade including a blade body defining a respective outer diameter of less than 1¼ inches and a cutting edge defined by a plurality of cutting teeth; and
   a base portion opposite the cutting edge and defining a threaded aperture adapted for threadedly engaging the threaded end portion of the arbor, and at least two drive surfaces radially spaced relative to the threaded aperture on substantially opposite sides of the threaded aperture relative to each other and defining a distance therebetween, wherein each drive surface engages a respective drive member of the arbor in the engaged position for rotatably driving the hole cutter;
   wherein (i) the plurality of hole cutters includes at least two hole cutters having blade bodies defining different outer diameters relative to each other that are selected from the group consisting of: about ⅞ inch, about 1 inch, and about 1⅛ inches, and (ii) the distance between the drive surfaces is substantially the same for each of the plurality of hole cutters.

12. A plurality of hole cutters as defined in claim 11, wherein the plurality of hole cutters includes three hole cutters, one hole cutter including a blade body defining an outer diameter of about ⅞ inch, another hole cutter including a blade body defining an outer diameter of about 1 inch, and another hole cutter including a blade body defining an outer diameter of about 1⅛ inches.

13. A plurality of hole cutters as defined in claim 12, further comprising a plurality of additional hole cutters having blade bodies defining additional different outer diameters different relative to each other selected from the group consisting of: about 9/16 inch, about ⅝ inch, about 11/16 inch, about ¾ inch, about 25/32 inch, about 13/16 inch, about 15/16 inch, about 1 1/16 inches, and about 1 3/16 inches.

14. A plurality of hole cutters as defined in claim 11, wherein the outer diameter of the blade body of each hole cutter of the plurality of hole cutters is different than the outer diameter of the blade body of every other hole cutter in the plurality of hole cutters.

15. A plurality of hole cutters as defined in claim 11, wherein the distance between the drive surfaces is within the range of about ⅜ inch to about ¾ inch.

16. A plurality of hole cutters, wherein each cutter is attachable to an arbor including a connecting portion, and at least two drive members radially spaced relative to the connecting portion and movable axially, but not rotationally, relative to the connecting portion between an engaged position with the drive members engaging a respective hole cutter to rotatably drive the hole cutter, and a disengaged position with the drive members disengaged from the hole cutter, each hole cutter comprising:

first means for cutting a hole having an outer diameter of less than 1¼ inches;

second means for connecting the first means to the connecting portion of the arbor; and at least two third means for engaging the at least two drive members of the arbor in the engaged position and for rotatably driving the hole cutter with the arbor that are radially spaced on opposite sides of the second means relative to each other and defining a distance therebetween, wherein (i) the plurality of hole cutters includes at least two hole cutters each having first means for defining different outer diameters relative to each other, and each outer diameter is selected from the group consisting of: about ⅞ inch, about 1 inch, and about 1⅛ inches, and (ii) the distance between the at least two third means is substantially the same for each of the plurality of hole cutters.

17. A plurality of hole cutters as defined in claim 16, wherein the first means is a hole cutter blade defining the respective outer diameter, the second means is a threaded aperture, and each third means is a drive surface located on an opposite side of the threaded aperture relative to the other drive surface.

18. A plurality of hole cutters as defined in claim 16, wherein the outer diameter of the first means of each hole cutter of the plurality of hole cutters is different than the outer diameter of the first means of every other hole cutter in the plurality of hole cutters.

\* \* \* \* \*

UNITED STATES PATENT AND TRADEMARK OFFICE
CERTIFICATE OF CORRECTION

| | |
|---|---|
| PATENT NO. | : 8,328,476 B2 |
| APPLICATION NO. | : 12/406724 |
| DATED | : December 11, 2012 |
| INVENTOR(S) | : Charles M. O'Keefe et al. |

It is certified that error appears in the above-identified patent and that said Letters Patent is hereby corrected as shown below:

In the claims:

Claim 16, column 22, line 12, "hole cutters each having first means" should be changed to --hole cutters each having means--

Signed and Sealed this
Twelfth Day of February, 2013

Teresa Stanek Rea
*Acting Director of the United States Patent and Trademark Office*